United States Patent [19]

Jerabek et al.

[11] Patent Number: 4,485,259

[45] Date of Patent: Nov. 27, 1984

[54] PIGMENT GRINDING VEHICLE

[75] Inventors: Robert D. Jerabek, Glenshaw; Jeffrey G. Koren, Butler; Mark W. Johnson, Gibsonia, all of Pa.

[73] Assignee: PPG Industries, Inc., Pittsburgh, Pa.

[21] Appl. No.: 430,304

[22] Filed: Sep. 30, 1982

[51] Int. Cl.$^3$ .............................................. C07C 91/26
[52] U.S. Cl. ................................... 564/292; 564/296; 428/143
[58] Field of Search ................. 564/292, 296; 428/143

[56] References Cited

U.S. PATENT DOCUMENTS

| | | | |
|---|---|---|---|
| 2,127,476 | 8/1938 | Ulrich et al. | 564/292 |
| 3,468,816 | 9/1969 | Thompson et al. | 260/2 |
| 3,624,082 | 11/1971 | Lewis et al. | 564/292 |
| 3,824,111 | 7/1974 | Jerabek | 106/308 N |
| 3,936,405 | 2/1976 | Sturni et al. | 260/29.2 EP |
| 4,007,154 | 2/1977 | Schimmel et al. | 260/37 EP |
| 4,186,124 | 1/1980 | Schimmel et al. | 260/37 EP |
| 4,238,373 | 12/1980 | Hardy et al. | 564/296 |
| 4,377,710 | 3/1983 | Seale et al. | 564/292 |

FOREIGN PATENT DOCUMENTS

| | | | |
|---|---|---|---|
| 1543650 | 11/1969 | Fed. Rep. of Germany | 564/292 |
| 2320253 | 11/1974 | Fed. Rep. of Germany | 564/292 |
| 1569209 | 5/1975 | Fed. Rep. of Germany | 564/292 |
| 1161552 | 8/1968 | United Kingdom | 564/292 |
| 1147647 | 4/1969 | United Kingdom | 564/292 |
| 1214581 | 12/1970 | United Kingdom | 564/292 |
| 2067196 | 1/1981 | United Kingdom | 564/292 |

OTHER PUBLICATIONS

McKelvey et al., "IEC, Prod. Res. Dev.", 6 pp. 115-120 (1967).
NEO-FAT® Fatty Acids Manual-by Armak Chemicals Division (1971), see pp. 15-17.

Primary Examiner—Werren B. Lone
Attorney, Agent, or Firm—Godfried R. Akorli

[57] ABSTRACT

A novel quaternary ammonium group-containing material which is obtained from reacting a monoepoxide with an amine containing at least one organic group containing an acyclic moiety of from about 8 to 30 carbon atoms is disclosed. The quaternary ammonium group-containing materials are useful as pigment grinding vehicles and in the formulation of pigment paste, particularly pigment paste with high pigment loadings. When formulated in cationic electrodepositable compositions, the pigment grinding vehicles provide for cured electrodeposited coatings of excellent corrosion resistance, particularly over untreated and oily steel.

9 Claims, No Drawings

PIGMENT GRINDING VEHICLE

BACKGROUND OF THE INVENTION

1. Field of the Invention

The present invention relates to a composition of matter useful as a pigment grinding vehicle and to pigment pastes formulated with such pigment grinding vehicles.

2. Brief Description of the Prior Art

In the formation of paints and especially electrodepositable paints, an important factor is the introduction of pigments into the paint. Pigments are typically ground with a grinding vehicle to form a pigment paste. The resultant paste is then combined with the film forming resin and optional ingredients to form the paint, giving the paint the proper color, or opacity, and application or film properties.

A problem with many pastes used for electrodeposition is the relatively low ratio of pigment to grinding vehicle which can be used. In cationic electrodepositable paints, pigment to grinding vehicle weight ratios are typically 5 to 1 or less. Pastes with higher ratios are not stable. Also, many pigment grinding vehicles do not contribute to, and many actually detract from some of the desirable properties of the resultant coating, particularly the property of corrosion resistance.

The present invention provides for pigment grinding vehicles which can be used to formulate stable pigment paste having relatively high pigment to grinding vehicle weight ratio. Also the instant pigment grinding vehicles enhance the corrosion resistance of the resultant coating.

SUMMARY OF THE INVENTION

In accordance with the foregoing, the present invention encompasses a quaternary ammonium group-containing material which is obtained from reacting (1) a monoepoxide, and (2) an amine containing at least one organic group which contains an acyclic moiety of from about 8 to 30 carbon atoms, under conditions sufficient to form the quaternary ammonium group.

The instant composition of matter has been found to be useful as a pigment grinding vehicle. Accordingly, the present invention encompasses a pigment paste comprising the instant composition of matter as a pigment grinding vehicle, and a pigment or pigments dispersed therewith. While these pastes can be useful in inks and many types of coatings, they are particularly useful in cationic electrodeposition compositions.

DETAILED DESCRIPTION OF THE INVENTION

The epoxy-containing material useful herein is a monoepoxide, more particularly a 1,2-monoepoxide which can be represented by the structural formula:

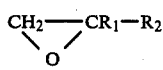

where $R_1$ is hydrogen or methyl and $R_2$ is hydrogen, alkyl including cycloalkyl, aryl preferably containing from 1 to 18 carbon atoms, substituted alkyl and aryl moieties, as long as the substituents do not interfere with reaction of the monoepoxide with the amine or the intended use of the resultant product, such as

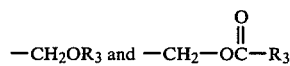

where $R_3$ is alkyl including cycloalkyl, aryl and substituted alkyl including cycloalkyl and aryl in which the alkyl and aryl moieties contain from 1 to 18 carbon atoms.

Illustrative examples of the monoepoxides are alkylene oxides containing from 2 to 8 carbon atoms including ethylene oxide, propylene oxide, 1,2-butylene oxide, 1,2-pentene oxide, styrene oxide and glycidol. Examples of other suitable materials are glycidyl esters of monobasic acids such as glycidyl acrylate, glycidyl methacrylate, glycidyl acetate, glycidyl butyrate; and glycidyl ethers of alcohols and phenols such as butyl glycidyl ether and phenyl glycidyl ether.

Particularly preferred are glycidyl ethers or esters of acids or alcohols containing an acyclic group of from about 4 to 24 carbon atoms. Typical examples of acids and alcohols include the saturated straight chain and branched chain series of fatty alcohols and acids as well as ethylenically unsaturated species and mixtures thereof, including octanoic or 2-ethylhexanoic acid at the lower end proceeding to lauric, palmitic, stearic, etc., at the upper end of the group. Highly branched tertiary carboxylic acid mixtures such as Shell's Versatic 911 acids are particularly useful herein. Fatty alcohols of equivalent chain length are used for the preparation of the glycidyl ethers.

The amines useful herein are preferably tertiary amines and are those which are capable of reacting with and opening the epoxide moiety in the presence of acid and/or water. The useful tertiary amines contain at least one lower alkyl group of from 1 to 4 carbon atoms, preferably methyl, and at least one organic group which contains an acyclic moiety of from about 8 to 30, preferably 12 to 18 carbon atoms. Preferably, two of the groups are methyl and the other one is an organic group containing an acyclic moiety of from about 8 to 30, preferably 12 to 18 carbon atoms. The term "organic group" as used herein is intended to encompass saturated and unsaturated groups, as well as substituted and unsubstituted hydrocarbyl groups, provided that the substituent does not adversely affect the reaction of the tertiary amine or the performance of the instant compositions derived therefrom. Examples of substituents would be hydroxy groups and alkoxy groups. Also, the acyclic group can contain moieties in the chain such as ester and ether groups.

Examples of the tertiary amines are those represented as:

wherein $R_1$, $R_2$ and $R_3$ are alkyl groups of which at least one group contains, each independently, from about 8 to 30 carbon atoms, and at least one group is a lower alkyl containing from 1 to 4 carbon atoms, preferably methyl. Preferably, one of the alkyl groups contains an acyclic moiety containing from about 8 to 30, and more preferably from about 12 to 18 carbon atoms, and two of the groups are lower alkyl containing from 1 to 4 carbon atoms, preferably methyl. Illustrative examples of the useful tertiary amines are N-octadecyldimethylamine, N-tetradecyldimethylamine, N-dodecyldimethylamine, N-decyldimethylamine, N-nonyldimethylamine, and N-octyldimethylamine. It is expected that heterocyclic amines in accordance with the above description will be useful herein.

In reacting the amine with the monoepoxide, usually a stoichiometric amount or an excess of epoxy is used. A stoichiometric excess of amine can be used, but is not preferred.

With tertiary amines, the monoepoxide and tertiary amine are reacted by mixing the two together, preferably in the presence of a controlled amount of water. The amount of water employed should be that amount of water which allows for smooth reaction of epoxy groups but not sufficient to cause extremely slow or no reaction. Typically, the water is employed on the basis of about 1.0 to about 16, preferably 2 to 10 moles of water per equivalent of amine nitrogen.

Reaction temperature may be varied between the lowest temperature at which reaction reasonably proceeds, for example, room temperature, or in the usual case, slightly above ordinary room temperature, to a maximum temperature of about 120° C. Obviously, for lower molecular weight alkylene oxides such as ethylene and propylene oxide which have high vapor pressures at room temperature, lower reaction temperatures should be used, and, if desired, the reaction could be conducted under pressure to insure complete reaction. With higher molecular weight epoxides such as butyl glycidyl ether, or the glycidyl ester of versatic acid, higher reaction temperatures can be used.

The reaction may be conducted in the presence of a solvent, if desired. If a solvent is employed, preferably it is capable of being used in the ultimate composition which is formed. For example, alcohols, ketones and glycol ethers may be used.

The reaction of the tertiary amine and the monoepoxide is usually conducted in the presence of acid and/or water to form the quaternary ammonium salt or hydroxide. Preferably, reaction is conducted in the presence of acid. Reaction can be conducted by first neutralizing the tertiary amine with acid to form the tertiary amine salt followed by reaction with the epoxide. Alternately, the epoxide, tertiary amine and acid can be reacted simultaneously or the amine and epoxide can be first reacted followed by acidification of the reaction product. Suitable acids are organic or inorganic acids having a pKa less than 6. Preferably, the acid is water-soluble and it is organic. Examples of acids include formic acid, acetic acid, phosphoric acid or the like.

To form the quaternary ammonium base group, the use of a tertiary amine is preferred. However, quaternary ammonium base group-containing resins can be prepared with primary and secondary amines. This can be accomplished by first reacting the primary or secondary amine with a monoepoxide. Reaction is continued until a tertiary amine is formed. Further, reaction with unreacted epoxy which may be from the original monoepoxide or from additionally added epoxy material is continued to form the quaternary ammonium base.

Besides quaternizing with additionally added epoxy material, alkylating agents such as dimethylsulfate and methyl iodide can be used, but their use is less preferred, particularly in preparing electrodeposition compositions.

The compositions of this invention have been found to be very effective as pigment grinding vehicles. The grinding vehicles are used to prepare pigment pastes containing one or more pigments which are ground with the grinding vehicle. The pigment pastes are prepared by grinding or dispersing the pigment into the grinding vehicle in a manner well known in the art. The pigment paste comprises as essential ingredients the quaternary ammonium pigment grinding vehicle prepared as described above and at least one pigment; however, the paste may, in addition, contain optional ingredients such as plasticizers, wetting agents, surfactants or defoamers.

Grinding is usually accomplished by the use of ball mills, sand mills, Cowles dissolvers, continuous attritors and the like until the pigment has been reduced to the desired size, preferably has been wet by and dispersed by the grinding vehicle. After the grinding, the particle size of the pigment is generally in the range of 10 microns or less.

Preferably, grinding is conducted in an aqueous dispersion of the vehicle. The amount of water present in the aqueous grind should be sufficient to produce a continuous aqueous phase. The aqueous grind usually contains about 30-70 percent total solids. The use of more water merely reduced the effective capacity of the mill and, while less water can be employed, higher resultant viscosity may create problems in certain instances.

One of the advantages of the pigment grinding vehicles of the present invention is their ability to be formulated into paste with high pigment to grinding vehicle weight ratios. Depending upon the pigment to be dispersed, typical weight ratios of at least 10 to 1, preferably higher, that is, 15 to 40:1, can be attained without the paste settling and separating, for example, when stored for 7 days at 120° F. (49° C.). Pigment paste with lower pigment grinding vehicle weight ratios, that is, as low as 1 to 1, can, of course, be prepared.

Pigments which may be employed in the practice of the invention are pigments well known in the art. Generally, titanium dioxide is the sole or chief white pigment; other white pigments and/or extender pigments including antimony oxide, zinc oxide, basic lead carbonate, basic lead sulfate, barium carbonate, China clay, calcium carbonate, aluminum silicate, silica, magnesium carbonate, magnesium silicate, among others, may be used. Colored pigments may also be employed, for example, cadmium yellow, cadmium red, carbon black, phthalocyanine blue, chrome yellow, toluidine red, hydrated iron oxide, among others.

The pigment paste can be combined with a film forming resin to form a paint. The film forming resin can be a cationic resin known in the art for electrodeposition. These resins are well known in the art and need not be described in detail. Examples of suitable resins include tertiary amine salt-containing resins such as those described in U.S. Pat. No. 4,148,772 assigned to PPG Industries, Inc., the assignee of the present invention, and quaternary ammonium salt-containing resins such as those described in U.S. Pat. No. 3,839,252 to Bosso et al. The portions of these references which describe suitable electrodepositable resins for cationic electrodeposition are hereby incorporated by reference.

Enough of the pigment paste is used so that the final electrodeposition composition (electrodepositable resin plus pigment paste) has the properties required for electrodeposition. In most instances, the final electrodepositable composition has a pigment-to-binder (electrodepositable resin plus pigment dispersant) ratio of between about 0.05 to about 0.6.

For electrodeposition, a bath containing about 5-25 percent by weight solids, that is, pigment plus resinous vehicle, is usually employed. This aqueous composition is then placed in contact with an electrically conductive anode and an electrically conductive cathode in an electric circuit. While in contact with the bath containing the coating composition, an adherent film of the coating composition is deposited on the cathode.

The conditions under which the electrodeposition is carried out are, in general, similar to those used in electrodeposition of other types of coatings. The applied voltage may be varied greatly and can be, for example, as low as one volt or as high as several thousand volts, although typically between 50 volts and 500 volts are usually employed. The current density is usually between about 0.25 ampere and 15 amperes per square foot and tends to decrease during electrodeposition.

The method of the invention is applicable to the coating of any conductive substrate and especially metal, such as steel, aluminum, copper and the like. After deposition, the coating is cured at elevated temperatures by any convenient method, such as in baking ovens or with banks of infrared heat lamps. Curing temperatures of at least 100° C., and usually 125° C. to 185° C. for at least 10 minutes and usually for about 10 to 30 minutes are employed.

One of the advantages of the pigment grinding vehicles of the present invention is the excellent corrosion resistance they impart to cationic electrodeposited coatings, over untreated steel or oily steel substrates when the coatings are cured at relatively low temperatures, i.e., 175° C. and below, typically 160°-175° C.

Illustrating the invention are the following examples, which are not to be construed as limiting the invention to their details. All parts and percentages in the examples, as well as throughout this specification, are by weight unless otherwise specified.

EXAMPLE I

This example illustrates the instant composition of matter and the method of preparing same.

| Ingredients | Parts by Weight in Grams |
| --- | --- |
| ARMEEN DM12D[1] | 218 |
| Butyl glycidyl ether | 123.5 |
| 88% Lactic acid | 97.3 |
| 2-Butoxyethanol | 100.0 |
| Deionized water | 25.0 |

[1]N—docecyldimethylamine.

The composition of matter was prepared by heating the ARMEEN DM12D, butyl glycidyl ether and 2-butoxyethanol in a properly equipped reaction vessel to a temperature of 45° C., followed by adding a solution of the lactic acid and the deionized water. There was a resulting exotherm, with the reaction temperature being maintained over the range of 82°-95° C., for a period of 1½ hours. The resultant reaction product was cooled and stored.

EXAMPLE II

This example illustrates the instant composition of matter and its use as a pigment grinding vehicle, the methods of preparing and using same.

| Ingredients | Parts by Weight in Pounds |
| --- | --- |
| ARMEEN DM18D[1] | 304.5 |
| CARDURA E[2] | 253.7 |
| Acetic acid | 57.0 |
| 2-Butoxyethanol | 100.0 |
| Deionized water | 25.0 |

[1]N—octadecyldimethylamine.
[2]Glycidyl ester of versatic acid 911, available from Shell Chemical Company.

The ARMEEN DM18D, CARDURA E and 2-butoxyethanol were heated to a temperature of 50° C., followed by adding the acetic acid and the deionized water. There was a resulting exotherm, with the reaction temperature being maintained over the range of 82°-95° C., over a period of 1½ hours. The resultant reaction product was cooled and stored.

A pigment paste using the above-described reaction product as a grinding vehicle was prepared as follows:

| Ingredients | Parts by Weight in Grams |
| --- | --- |
| Aluminum silicate clay | 446.4 |
| Lead silicate | 72.1 |
| Carbon black | 57.5 |
| Deionized water | 407.2 |
| Pigment grinding vehicle | 48.8 |

The grinding vehicle was blended with the above pigments and the deionized water to form a slurry which was ground in a Jiffy mill for 2 hours to a Hegman 7+ grind. The pigment-to-binder ratio was 15:1.

A cationic paint comprising a blend of the above pigment paste and an electrodepositable resinous film-forming composition was prepared as follows. The electrodepositable resinous film-forming composition was prepared with the following:

| Ingredients | Parts by Weight in Grams |
| --- | --- |
| EPON 829[1] | 727.6 |
| PCP-0200 | 268.4 |
| Xylene | 36.1 |
| Bisphenol A | 197.8 |
| Benzyldimethylamine | 3.8 |
| Capped isocyanate crosslinker[2] | 933.5 |
| Diketimine derived from diethylene triamine and methyl isobutyl ketone (73% solids in methyl isobutyl ketone) | 73.4 |
| N—methylethanolamine | 59.1 |
| 2-Hexoxyethanol | 76.5 |
| Acetic acid | 33.5 |
| Cationic dispersant[3] | 29.4 |
| Deionized water | 1793.1 |

[1]Epoxy resin solution made from reacting epichlorohydrin and bisphenol A having an epoxy equivalent of 188 commercially available from Shell Chemical Company.
[2]Polyurethane crosslinker formed from half-capping toluene diisocyanate (80/20 2,4-/2,6-isomer mixture) with 2-ethylhexanol and reacting this product with trimethylolpropane in a 3:1 molar ratio. The crosslinker is present as a 70 percent solids solution in a 90/10 mixture of methyl isobuty ketone and n-butanol.
[3]The cationic dispersant was prepared by blending 120 parts of an alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol, 221 parts by weight of deionized water and 19 parts of glacial acetic acid.

The EPON 829, PCP-0200 and xylene were charged to a reaction vessel and heated with a nitrogen sparge to 210° C. The reaction was held at reflux for about ½ hour to remove water. The reaction mixture was cooled to 150° C. and the bisphenol A and 1.6 parts of the benzyldimethylamine (catalyst) added. The reaction mixture was heated to 150°–190° C. and held at this temperature for about 1½ hours and then cooled to 130° C. The remaining portion of the benzyldimethylamine catalyst was added and the reaction mixture held at 130° C. for 2½ hours until a reduced Gardner-Holdt viscosity (50 percent resin solids solution in 2-ethoxyethanol) of P was obtained.

The polyurethane crosslinker, the diketimine derivative and the N-methylethanolamine were then added and the temperature of the reaction mixture brought to 110° C. and held at this temperature for 1 hour.

The 2-hexoxyethanol was added and the reaction mixture was dispersed in water by adding the reaction mixture to a mixture of the acetic acid, deionized water and the cationic dispersant. This dispersion was diluted to 32 percent solids with deionized water and vacuum stripped to remove organic solvent to give a dispersion having a solids content of 36 percent.

The above electrodepositable composition and pigment pastes were blended to form a cationic paint having a pigment-to-binder ratio of 0.2, and a solids content of 20 percent. The paint had a conductivity of about 1400 μmhos/cm after ultrafiltration, and pH after adjustment with acetic acid was 6.2. Steel panels were electrodeposited in the paint at 175 volts for 2 minutes at a paint temperature of 25° C. The coated panels were baked at 170° and 182° C. for 20 minutes to obtain hard, glossy and smooth coatings having a film thickness of about 0.4 to 0.7 mils.

COMPARATIVE EXAMPLE

For comparison, steel panels were electrocoated with a paint which was similar to the paint of Example II with the exception of the pigment grinding vehicles used. The pigment grinding vehicle is the reaction product of EPON 828 and a tertiary amine containing blocked isocyanate groups. The vehicle is described in Example II of U.S. Pat. No. 4,007,154. The pigments of Example II were ground with this vehicle to form the paste.

The comparative paint had a pigment-to-binder ratio of 0.2 and a solids content of 20 percent by weight, the same as the paint of Example II. Steel panels were electrodeposited in the paint at 275 volts for 2 minutes at a paint temperature of 25° C. The coated panels were baked at 170° and 182° C. for 20 minutes to obtain hard, glossy, smooth coatings having a film thickness of about 0.4 to 0.5 mils.

Panels coated with the cured paint of Example II were compared with panels coated with the cured paint of the comparative example. The paint of Example II was adjusted with 2-butoxyethanol (36 grams per gallon of paint) to equal the solvent content of the paint of the Comparative Example.

The comparison was between corrosion resistance properties. The coated panels coated and baked as described above were scribed with an "X" mark and placed in a salt spray chamber at 100° F. (38° C.) at 100 percent by weight relative humidity atmosphere of 5 percent by weight aqueous sodium chloride solution for a period of 14 days. After 14 days, the creepage from the scribe mark was measured and reported as shown in Table I below.

TABLE I

| Paint | Scribe Creepage in microns At: | |
|---|---|---|
| | 182° C./20 minutes | 171° C./20 minutes |
| Evaluation of Salt Spray Testing on Bare Steel | | |
| Comparative Example | 1.6 | 4.7 |
| Example II | 0.8 | 3.2 |
| Evaluation of Salt Spray Testing on Oily Steel | | |
| Comparative Example | 7.8 | 9.4 |
| Example II | 1.6 | 1.6 |

The above specific illustrations and other descriptions herein are not intended to limit the scope of the invention. Instead, it is intended that the invention include all variations and modifications falling within the scope of the appended claims.

What is claimed is:

1. A quaternary ammonium group-containing material which is obtained from reacting:
    (1) a 1,2-monoepoxide which is a glycidyl ether or ester containing an acyclic group of from about 4 to 24 carbon atoms, and
    (2) an amine containing at least one organic group which contains an acyclic moiety of from about 8 to 30 carbon atoms, in the presence of an organic acid and/or water; the reaction is conducted at temperatures ranging from room temperature to about 120° C.

2. The quaternary ammonium group-containing material of claim 1, wherein the fatty glycidyl ester is a glycidyl ester of versatic acid.

3. The quaternary ammonium group-containing material of claim 1, wherein the amine is of the structure:

wherein R$_1$, R$_2$ and R$_3$ are alkyl groups of which at least one group contains an acyclic moiety of from about 8 to 30 carbon atoms and at least one group is methyl.

4. The quaternary ammonium group-containing material of claim 1, containing at least two alkyl groups of 1 to 4 carbon atoms.

5. The quaternary ammonium group-containing material of claims 3 or 4 wherein two groups are methyl.

6. The quaternary ammonium group-containing material of claim 4, wherein the amine is N-octadecyldimethylamine.

7. A pigment grinding vehicle comprising the quaternary ammonium group-containing materials of claim 1 which is at least partially acid-neutralized.

8. A pigment paste comprising:
    (A) the grinding vehicle as recited in claim 7, and
    (B) a pigment dispersed with (A).

9. A pigment paste of claim 8, wherein the weight ratio of (B) to (A) is at least 10:1.

* * * * *